(12) United States Patent
Crane

(10) Patent No.: US 10,987,985 B2
(45) Date of Patent: Apr. 27, 2021

(54) LOAD LEVELLING DEVICE FOR TOWED VEHICLE COUPLINGS

(71) Applicant: Lovells Springs Pty Ltd, Carrington (AU)

(72) Inventor: Simon Crane, Carrington (AU)

(73) Assignee: Lovells Springs Pty Ltd, Carrington (AU)

( * ) Notice: Subject to any disclaimer, the term of this patent is extended or adjusted under 35 U.S.C. 154(b) by 301 days.

(21) Appl. No.: 16/176,599

(22) Filed: Oct. 31, 2018

(65) Prior Publication Data

US 2020/0130442 A1 Apr. 30, 2020

(30) Foreign Application Priority Data

Oct. 26, 2018 (AU) .................................. 2018101609

(51) Int. Cl.
  *B60D 1/46* (2006.01)
  *B60D 1/64* (2006.01)
  *B60D 1/44* (2006.01)
  *B60D 1/42* (2006.01)
  *B60D 1/04* (2006.01)
  *B60D 1/02* (2006.01)

(52) U.S. Cl.
  CPC ............... *B60D 1/46* (2013.01); *B60D 1/44* (2013.01); *B60D 1/64* (2013.01); *B60D 1/02* (2013.01); *B60D 1/04* (2013.01); *B60D 1/42* (2013.01)

(58) Field of Classification Search
  CPC ... B60D 1/46; B60D 1/44; B60D 1/64; B60D 1/42; B60D 1/04; B60D 1/02
  See application file for complete search history.

(56) References Cited

U.S. PATENT DOCUMENTS 9,469,171 B2 * 10/2016 Morga .................. B60D 1/246
9,840,120 B1 * 12/2017 Alhazza ................ B60D 1/075
(Continued)

*Primary Examiner* — Kevin Hurley
*Assistant Examiner* — Marlon A Arce
(74) *Attorney, Agent, or Firm* — Merchant & Gould P.C.

(57) ABSTRACT

A load levelling device for adjusting the pitch of a first towing vehicle relative to a ground surface when the first towed vehicle is coupled to a second towed vehicle includes: a towing pillar having a longitudinal axis; a towing tongue adapted for attachment to the first towing vehicle and mounted on the towing pillar for sliding engagement therewith; a clutch housing radially supported on the towing pillar beneath the towing tongue for sliding engagement with the towing pillar, the clutch housing including a blade recess in a lateral portion thereof, the blade recess extending orthogonally to the longitudinal axis of the towing pillar; a tensioning blade having a leading end and a trailing end, the leading end adapted for being removably securable in the blade recess of the clutch housing and the trailing end being adapted for attachment to the second towed vehicle; and a user operational force application device for selectively applying a vertical force to the trailing edge of the tensioning blade. An upwardly applied force on the trailing edge of the tensioning blade imparts a counter-clockwise moment to the tensioning blade, which counter-clockwise moment is transmitted through the clutch housing, the towing pillar and the towing tongue, so as to level the pitch of a first towing vehicle to which the load levelling device is attached, relative to the ground surface.

10 Claims, 7 Drawing Sheets

(56) References Cited

U.S. PATENT DOCUMENTS

| | | | |
|---|---|---|---|
| 10,040,326 B1* | 8/2018 | O'Connell | B60D 1/46 |
| 2006/0284396 A1* | 12/2006 | Smith | B60D 1/46 |
| | | | 280/490.1 |
| 2011/0037242 A1* | 2/2011 | Hensley | B60D 1/30 |
| | | | 280/477 |
| 2017/0136836 A1* | 5/2017 | Davis | B60D 1/465 |
| 2019/0126697 A1* | 5/2019 | Adachi | B61G 1/02 |
| 2020/0305333 A1* | 10/2020 | Hingne | B60D 1/246 |

* cited by examiner

LOAD LEVELLING DEVICE FOR TOWED VEHICLE COUPLINGS

This application claims the benefit of Serial No. 2018101609, filed 26 Oct. 2018 in Australia, and which application is incorporated herein by reference. To the extent appropriate, a claim of priority is made to the above-disclosed application.

TECHNICAL FIELD

The present invention relates to a load levelling device for adjusting the pitch of a towing vehicle relative to the ground as it is attached to a second towed vehicle. The invention further relates to sway control of a towed vehicle.

BACKGROUND

Coupling devices have been developed to connect together a first towing vehicle to a second towed vehicle. For example, they are used to connect locomotives, to wagons, trucks and automobiles to towed vehicles and trailers on rail, road and off-road. Known tow coupling technologies have generally been categorised by the following characteristics:

1 A structure attached to the rear part of the first towing or powered vehicle, so as to allow the fitment of a pillar, post or pintle in a secure manner so as to accommodate all conceivable towing loads to be imposed on it.

2 A post, pillar or pintle, which engages with the towed part of the towing coupling and allows articulation in one or more planes of the towed vehicle relative to the towing vehicle.

3 A body, receiver or hook of the tow coupling, to allow the above described articulation and to connect with a further body mounted on the towed vehicle. This connection may allow for a further axis of articulation between the towing and towed vehicles.

4 A hitch-body mounted on the towed vehicle, connected to the body, receiver or hook.

Towing speeds have increased as a result of single and double-axle trailers being towed behind high speed vehicles on good quality roads and highways. The dynamics of towed vehicles generally, and particularly at higher speeds, are such that to form a stable dynamic system in the horizontal plane, the centre of gravity of the towed vehicle should generally be located forward of the axle line of the towed vehicle. This necessitates a considerable downwards load being imposed by the tow coupling onto the rear axle of the towing vehicle.

This downwards load on the rear axle of the towing vehicle is exacerbated by the distance the load is applied rearwards of the rear axle, which also produces an uplift at the towing vehicle front axle. These two forces, acting together as a moment, can cause problems for the towing vehicle, such as a lack of rear suspension travel, additional loads on towing vehicle components, headlight alignment difficulties with respect to oncoming traffic, loss of control at the front steering wheels, as well as severe instability of the entire towing system under sudden heavy braking.

Over a series of longitudinal undulations in the road surface taken at speed, the towed vehicle and the towing vehicle can begin to oscillate with respect to each other in a vertical plane, i.e. in pitch, out of phase by 180 degrees relative to one another.

In addition, due to an inadequate margin of stability of the towing/towed vehicle system, sway or oscillation of the towed vehicle in the horizontal plane relative to the direction of forward travel of the towing vehicle may be possible. The sway or oscillation may develop spontaneously, without external perturbations being necessary, or may be excited by external forces such as cross winds, traffic travelling in the opposite direction at speed, or other stochastic forces acting on the towed or towing vehicles. This oscillatory sway or cyclic yawing across the direction of travel is highly dangerous, as it can cause a loss of the control of the entire towed vehicle system, resulting in an out-of-lane or off-road excursion, accident and possible injury or death to the occupants of the towing vehicle or other motorists or bystanders.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

A load levelling device for adjusting the pitch of a first towing vehicle relative to a ground surface when the first towed vehicle is coupled to a second towed vehicle, the load levelling device comprising: a towing pillar having a longitudinal axis; a towing tongue adapted for attachment to the first towing vehicle and mounted on the towing pillar for sliding engagement therewith; a clutch housing radially supported on the towing pillar beneath the towing tongue for sliding engagement with the towing pillar, the clutch housing including a blade recess in a lateral portion thereof, the blade recess extending orthogonally to the longitudinal axis of the towing pillar; a tensioning blade having a leading end and a trailing end, the leading end adapted for being removably securable in the blade recess of the clutch housing and the trailing end being adapted for attachment to the second towed vehicle; and a user operational force application device for selectively applying a vertical force to the trailing edge of the tensioning blade, whereby an upwardly applied force on the trailing edge of the tensioning blade imparts a counter-clockwise moment to the tensioning blade, which counter-clockwise moment is transmitted through the clutch housing, the towing pillar and the towing tongue, so as to level the pitch of a first towing vehicle to which the load levelling device is attached, relative to the ground surface.

As the load levelling device applies a moment to the towing fixture at the rear of the towing vehicle, the result is an increase in the load applied onto the front axle of the towing vehicle and a decrease in the load applied by the second towed vehicle, for example the weight of a draw bar of a trailer onto the rear axle, thus levelling the towing vehicle relative to the ground surface. This improves driveability and stability of the towing vehicle-towed vehicle combination.

In some embodiments, a friction clutch is arranged on the towing pillar beneath the towing tongue and is adapted for selective locking engagement with the towing tongue to prevent relative rotation between the towing tongue and the friction clutch.

In some embodiments, a user operable locking device is provided for selectively locking the friction clutch to the towing tongue.

The load levelling device therefore also applies a constant counter-torque to the draw bar of the trailer or other towed vehicle in the event of sway or yaw of the trailer relative to the towing vehicle, whilst the vehicles are in motion. However, the applied counter-torque to or damping of any relative rotation of the trailer relative to the towing vehicle can be quickly turned off for low speed manoeuvring and parking of the towing vehicle and trailer.

In some embodiments, the friction clutch includes: a coupling plate mounted on the towing pillar beneath the towing tongue and adapted for selective locking engagement with the towing tongue to prevent relative rotation therebetween; at least one coupling plate biasing member adapted for biasing the coupling plate away from the towing tongue; a friction plate arranged within the clutch housing beneath the coupling plate and in direct contact with the coupling plate; a pressure plate arranged within the clutch housing beneath the friction plate, and at least one friction clutch biasing member adapted for biasing the pressure plate and friction plate against the coupling plate; wherein the user operable locking device is adapted for selectively locking the coupling plate to the towing tongue.

In some embodiments, the coupling plate includes one of lugs and corresponding recesses in an upper surface thereof and the towing tongue includes the other of the lugs and corresponding recesses in a lower surface thereof, and wherein the user operable locking device includes a rotary cam that is user rotatable to cause the coupling plate to lift against the towing tongue to engage the lugs into the corresponding recesses. In some embodiments, the user operable locking device includes a handle adapted for user rotation of the rotary cam in a plane orthogonal to the longitudinal axis to selectively engage or disengage the lugs into or from the corresponding recesses.

In some embodiments, the rotary cam includes at least one ramp projection adapted for engaging a lower surface of the coupling plate to lift the coupling plate against the towing tongue to engage the lugs into the corresponding recesses.

In some embodiments, the lower surface of the coupling plate further includes at least one ramp projection corresponding to the rotary cam ramp projection to assist the lifting of the coupling plate against the towing tongue.

In some embodiments, a user operable levelling jack is connected to the trailing end of the tensioning blade for application of the upward force to the trailing end of the tensioning blade. This provides an easy method for a user to apply the large force required to adjust the pitch of the towing vehicle without having to apply significant exertion to do so.

The levelling jack may be connected to the tensioning blade via a trunnion mount system. Accordingly, during forward progress of a combination of a towing vehicle and a towed vehicle over an undulating surface that causes the vehicles to oscillate in pitch relative to each other, the trunnion mount system of the levelling jack permits oscillatory motion of the levelling jack in the longitudinal direction to accommodate the changing geometry of the tensioning blade with respect to the towed vehicle. The trunnion mount system also allows the towing and towed vehicles to yaw with respect to each other and allows the tensioning blade to be maintained aligned with a longitudinal centreline of the towed vehicle whilst without deflection or mechanical failure exerting sufficient torque on the friction clutch in the clutch housing to successfully damp the lateral yawing motions if they are oscillatory and undesirable for safe towing.

The load levelling device disclosed herein meets the requirement for a mechanism to connect a second unpowered towed vehicle to a first powered towing vehicle for the purpose of controlling the deviation of fore and aft pitch from level of the first powered vehicle when its rear axle has vertical downwards load applied to it by the tow coupling attached to the second towed vehicle. The device applies a torque (or "moment") to the towing fixture at the rear of the first towing vehicle, which has the effect of applying an increased vertical downwards load to the front axle of the towing vehicle, and a reduction in vertical downwards load to the rear axle of the towing vehicle. This applied moment in the vertical plane is easily adjusted by the operator without undue physical effort so as to achieve a more satisfactory axle load distribution between the front and rear axles of the towing vehicle. The load levelling device also has a secondary function, to control any yaw of the second towed vehicle relative to the direction of travel of the towing vehicle when in motion, by means of applying a resisting torque to any such uncontrolled yawing motion. This yaw-resisting torque can be switched on and off by the operator with a simple lever or handle to allow manoeuvring of the towing and towed vehicles at low speeds or the stowage of the device under the towbar of the towing vehicle.

BRIEF DESCRIPTION OF DRAWINGS

One or more embodiments of the invention will now be described by way of specific example(s) with reference to the accompanying drawings, in which:

FIG. 3b is a cross-section view taken at the line B-B of FIG. 3a;

DESCRIPTION OF EMBODIMENTS

Figure 4A:
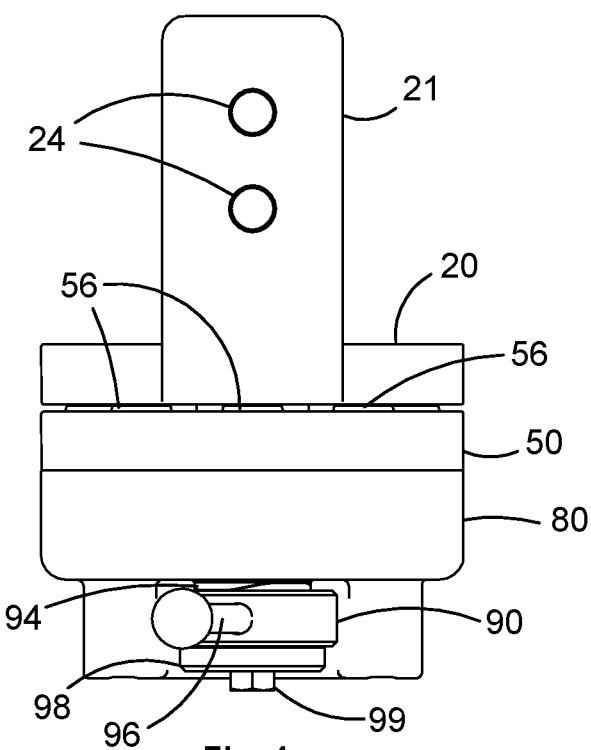
FIG. 4a is a schematic vertical sectional view of the load levelling device showing the rotary cam in a closed configuration.
Figure 4B:
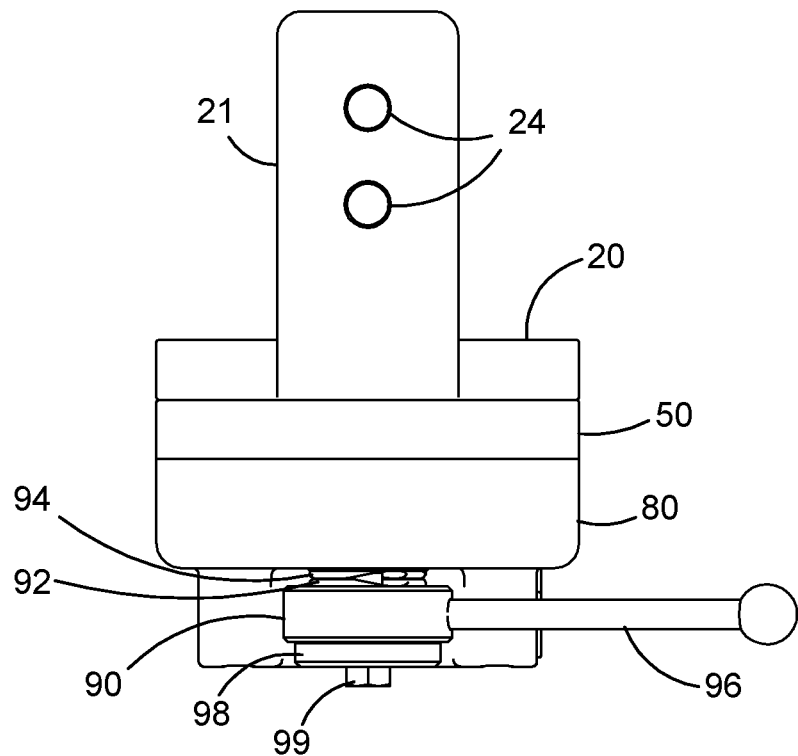
FIG. 4b is a schematic vertical sectional view of the load levelling device showing the rotary cam in an open configuration.
Figure 5:
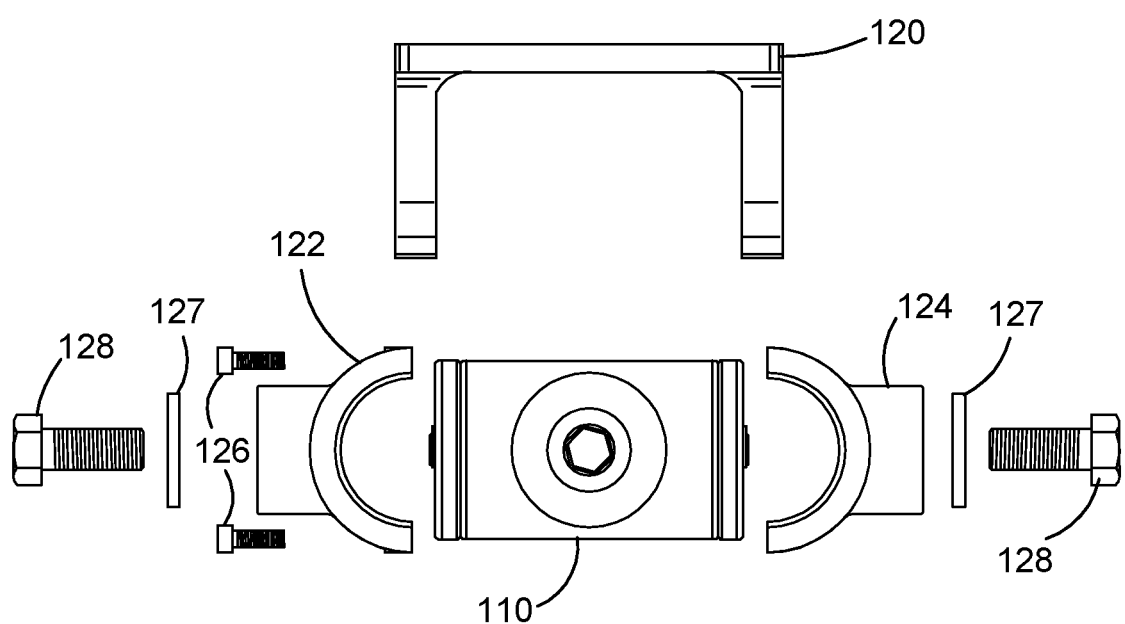
FIG. 5 is an exploded side view of a levelling jack and trunnion mounting system.
Figure 6:
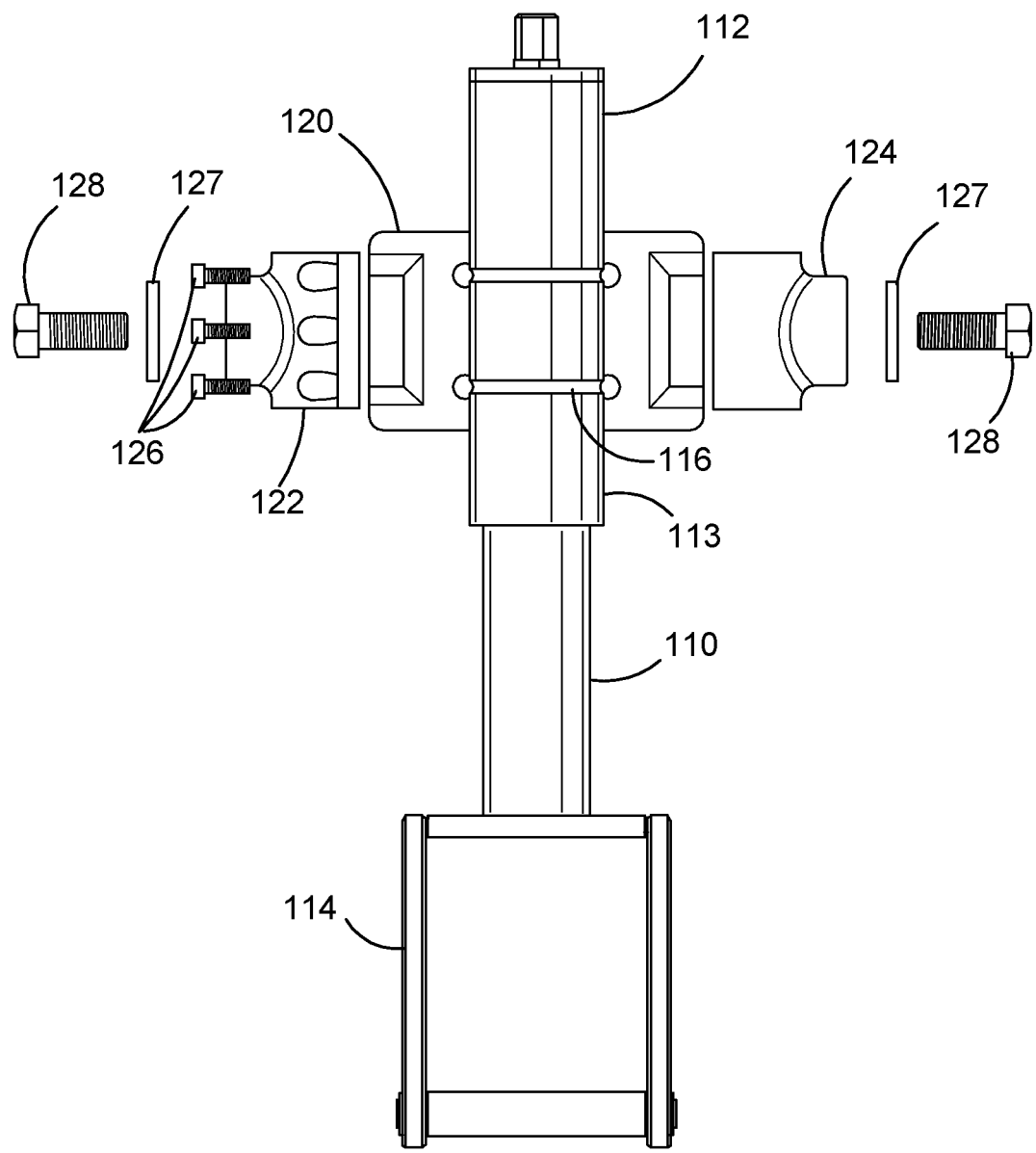
FIG. 6 is an exploded plan view of the trunnion mounting system of FIG. 4.

FIGS. 1 to 6 show an embodiment of a load levelling device 10 for augmenting the coupling of a first towing vehicle 200 to a second towed vehicle 300 (shown schematically in FIG. 6). The load levelling device 10 is adapted to sit under a tow loop 2 of the towing vehicle 200 and includes a towing tongue 20, a towing pillar 30, and a friction clutch 40. The friction clutch includes a coupling plate 50, friction plate 60 and a pressure plate 70.

The towing tongue 20 is adapted for secure mounting to the first, or towing, vehicle 200. The towing tongue 20 is generally L-shaped when viewed in profile (see FIG. 2) and has a vehicle attachment plate 21 and a circular tongue plate 22 formed at an angle of 90 degrees thereto. The particular form of the towing tongue 20 can be adapted to meet the statutory requirements relating to the strength of tow couplings required by a certifying authority in the country of intended use. The vehicle attachment plate 21 includes a pair of apertures 24 for receiving bolts therein for mounting the towing tongue 20 to the first towing vehicle 200. The tongue plate 22 has a flat upper operating face 25, a lower operating face 26 and includes a mounting aperture 23 there through in which the towing pillar 30 is slidably received. The lower operating face 26 has a series of recesses 27 disposed in a circle around the mounting hole 23, see FIG. 2. The recesses 27 allow for engagement of corresponding lugs 52 fitted to an upper face 54 of the coupling plate 50. The towing pillar 30 is receivable in the mounting aperture 24 and is securely fastened to the towing tongue 20 by means of a spacer 33 and pillar nut 36.

Figure 1:
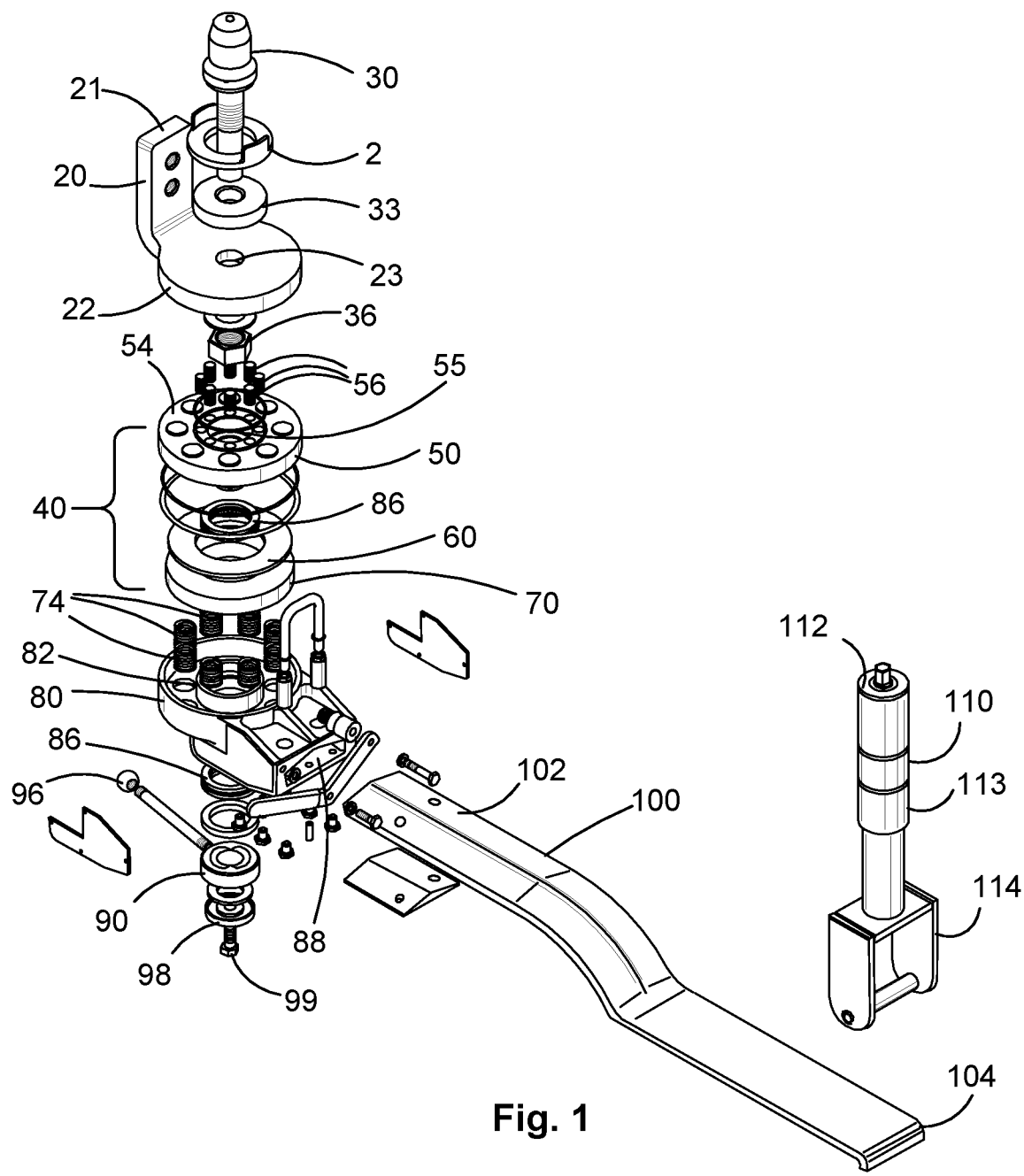
FIG. 1 is an exploded view of a load levelling device according to a preferred embodiment.
Figure 2:
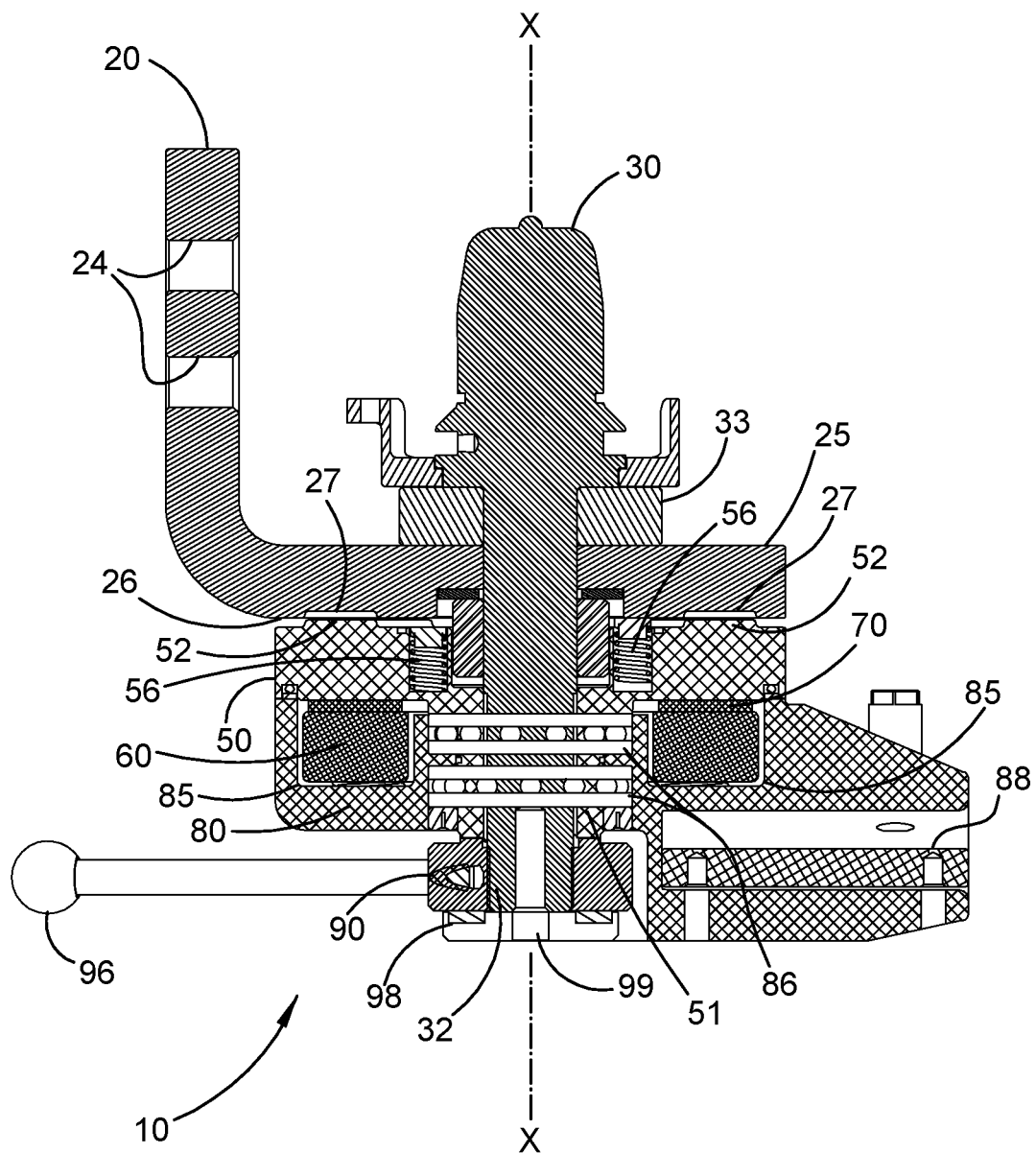
FIG. 2 is a cross-sectional view of components of the load levelling device of FIG. 1.
Figure 3A:
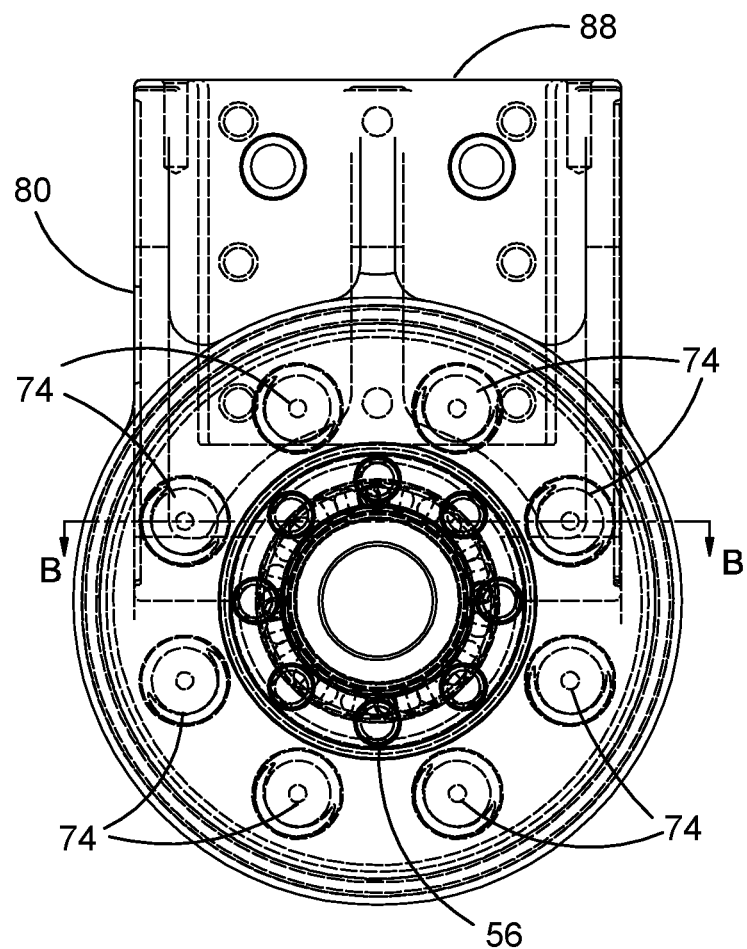
FIG. 3a is a plan view of the clutch mechanism.
Figure 3B:
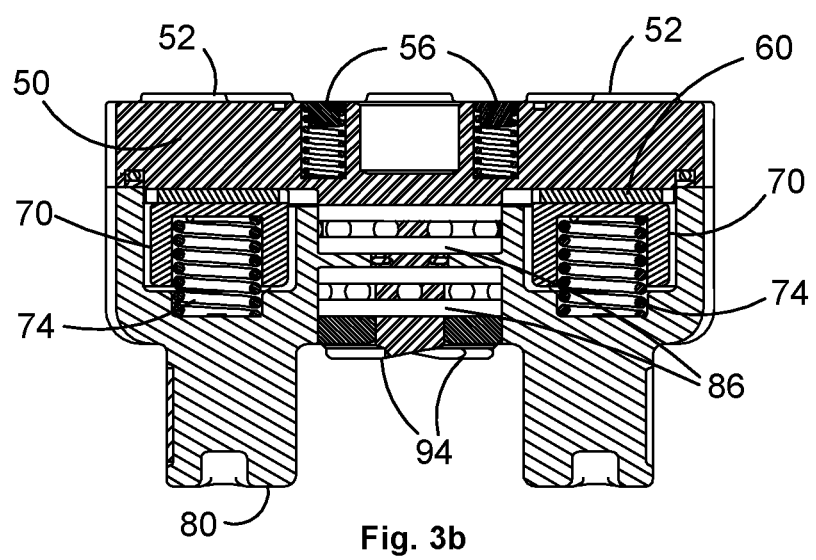

The towing pillar 30, attached to the first towing vehicle 200, has a longitudinal axis X-X shown in FIG. 2 and an upper portion that is shaped for use with further components of a tow coupling device that does not form part of the present invention. The specific contoured shape shown in FIGS. 1 and 2 is illustrative of a suitable pillar shape for use in Australia, however the shape may be any suitable shape to meet statutory minimum strength requirements for tow couplings in the country of sale and may be adapted in shape to suit any commercial towing coupling connection system. The towing pillar 30 has a lower shaft 32 extending below the towing tongue 20 which has a generally elongate cylindrical shape. The generally cylindrical shaft 32 acts as an axis of rotation for a number of other components of the levelling device 10 to be described below.

The coupling plate 50 of the friction clutch 40 has a circular plate of similar thickness to the tongue plate 22 of the towing tongue 20 and an annular lower portion 51. The coupling plate 50 includes a central mounting aperture 55 through the lower portion 51 in which the shaft 32 of the towing pillar 30 is received. The coupling plate 50 is fitted to the underside of the towing tongue 20, and is formed with the projecting male lugs 52 on its upper surface that are formed so as to engage with the corresponding female recesses 27 in the lower operating face 26 of the towing tongue 20. When engaged, these lugs 52 will prevent relative rotational motion of the coupling plate 50 and the towing tongue 20.

Fitted into recesses in the upper surface of the coupling plate 50 are a plurality of coupling plate biasing members in the form of helical coil springs 56, which at all times act in compression so as to separate the coupling plate 50 from the towing tongue 20, allowing rotation of one relative to the other, unless other forces act to force these parts into close proximity and prevent relative rotation by engagement of the lugs 52 and recesses 27.

The coupling plate 50 is free to rotate about the shaft 32 of the towing pillar 30, so that when the lugs 52 and recesses 27 are not engaged, relative rotation of the coupling plate 50 and towing tongue 20 is free but controlled as to its axis of rotation. The coupling plate 50 is also free to slide along the shaft 32.

The friction plate 60 is an annular thin plate of material suited to providing a preferential and non-galling wearing surface when compared with the coupling plate 50 and the pressure plate 70 generally made of a resin-infused fibrous material, for example glass fibre material, or sintered bronze and is fitted immediately to the underside of the coupling plate 50. The friction plate 60 is free to rotate about the shaft 32 of the towing pillar 30 and is also free to slide along the shaft 32.

The pressure plate 70 is a metal disc of similar thickness to the coupling plate 50 and is fitted on the shaft 32 immediately underneath the friction plate 60 such that the friction plate 60 is sandwiched between it and the coupling plate 50. The pressure plate 70 is free to rotate about the shaft 32 and also to slide along the shaft 32. A lower surface 72 of the pressure plate 70 includes a plurality of recesses in each of which is received a friction clutch biasing member in the form of a helical coil compression spring 74. The compression springs 74 bias the pressure plate 70 in an upwards direction to drive the pressure plate 70 upwards to apply pressure to the friction plate 60 against the coupling plate 50.

The friction plate 60 and pressure plate 70 of the friction clutch 40 are housed in a clutch housing 80 as will now be described. The clutch housing 80 includes an annular housing portion having a central mounting aperture 82 and is located on the shaft 32 of the towing pillar 30. Two ball bearings 86 located centrally on the shaft 32 and adjacent the clutch housing 80 radially support the clutch housing 80 and allow smooth rotation of the clutch housing 80 about the shaft axis. The clutch housing 80 includes recesses 85 in an upper surface thereof in which are seated a lower end of each of the clutch compression springs 74. The clutch housing 80 is free to rotate relative to the towing tongue 20 and the towing pillar 30, however can be restrained by both the upper clutch mechanism formed by the lugs 52 and recesses 27 of the coupling plate 50 and towing tongue 20 respectively, and the friction clutch mechanism 40 formed by the coupling plate 50, friction plate 60 and pressure plate 70, acted upon by the compression springs 74. The effect of the coupling plate 50, friction plate 60 and pressure plate 70 held in compression by the compression springs 74 is that together they provide a powerful resistance to relative rotational motion between the three plate components.

The clutch housing 80 also functions to capture a leading end 102 of a tensioning blade 100 therein. A horizontally oriented blade recess 88 is present in a lower lateral side of the clutch housing 80 that faces directly away from the vehicle attachment portion 21 of the towing tongue 20, as shown in FIG. 2. The blade recess 88 is shaped for a close fit with the leading end 102 of the tensioning blade 100, described below, for its secure capture within the blade recess 88. The clutch housing 80 is retained on a lower end of the towing pillar shaft 32 by a rotary cam 90.

The rotary cam 90 is an annular component fitted to the end of the shaft 32 of the towing pillar 30, beneath and in abutting contact with the clutch housing 80 and free to rotate about the shaft 32. The rotary cam 90 is retained on the lower end of the shaft 32 using an appropriate fastening means such as a captive nut 98 and bolt 99. An upper surface of the rotary cam 90 includes a plurality of raised ramp features or projections 92 (seen in FIG. 4(*a*) and FIG. 4(*b*), such that rotation of the rotary cam 90 relative to the coupling plate 50 above it causes the ramp features 92 to interact with similar ramp features or projections 94 (seen in FIG. 4(*b*) and FIG. 3) on the underside of the lower portion of the coupling plate 50. The interaction causes the coupling plate 50 to lift a small distance along the shaft 32 of the towing pillar 30 towards the towing tongue 20, causing the lug features 52 on the upper surface of the coupling plate 50 to engage with the recesses 27 of the lower surface 26 of the towing tongue 20.

The rotary cam 90 has a cam lever 96 attached thereto for user rotation of the rotary cam 90 about the axis X-X. The rotary cam 90 thus rotates on the end of the shaft 32 when the cam lever 96 is activated by an operator.

FIG. 4a shows the rotary cam device in an unlocked position in which a small gap of a few millimetres is present between the upper surface of the coupling plate 50 and the lower surface of the towing tongue 20. When an operator rotates the rotary cam 90 in the horizontal plane with the cam lever 96, the ramp features or projections 92 of the upper surface of the rotary cam 90 act against the ramp features or projections 94 on the underside of the coupling plate 50 having the effect of lifting the coupling plate 50 a small distance against the action of the coupling plate helical coil springs 56, which has the effect of allowing the coupling plate 50 to come into contact with the underside of the towing tongue 20. In the embodiment shown, rotation of the cam lever 96 through an angle of 90 degrees will move the rotary cam between locked and unlocked positions.

The recesses 27 in the towing tongue 20 can now be engaged by the lugs 52 on the coupling plate 50 and thus lock the two components together in a rotational sense. The overall effect is thus that the rotary cam 90 is part of a user operable locking device and a rotation of the cam lever 96 locks and unlocks the movement of the coupling plate 50, and all other components attached to it, to the towing tongue 20 in a rotational sense.

Due to the action of the clutch compression springs 74 holding the pressure plate 70 hard against the said coupling plate 50 with the friction plate 60 interposed between the two, any rotational torque applied to the clutch housing 80 is applied to the coupling plate 50 until such time as this torque exceeds a predetermined value i.e. a clutch breakaway torque, and allows relative motion of clutch housing 80 to the coupling plate 50 while the externally applied torque exceeds the clutch breakaway torque. In an example embodiment, the clutch breakaway torque is 500 to 1500 Nm.

The entire system can thus be summarised as a double clutch mechanism in series, connecting the towing tongue 20 to the clutch housing 80, an upper clutch being positive and non-slipping wheresoever the cam lever 96 is in an engaged position, and at the lower end, a friction clutch 40 with a known breakaway torque, which will cause the pressure plate 70 and the coupling plate 50 to slip, one relative to the other in rotation, when an externally applied torque exceeds this magnitude.

The tensioning blade 100 is a long leaf made from high strength spring steel, which, as noted, engages and fastens into the recess or slot 88 that is formed laterally into the side of the clutch housing 80. The recess is a snug fit around the tensioning blade 100, such that a torque applied to the clutch housing 80 by or using the tensioning blade 100 are resisted in both the vertical and horizontal planes. The tensioning blade 100 is fastened into the recess 88 at its leading end 102 using screws or other appropriate fixing means, such that an external force applied at its trailing end 104 causes a moment to be applied to the clutch housing 80 in the vertical plane. The moment is fully transmitted through the ball bearings 86 to the towing pillar 30 and thence through the towing tongue 20 directly to the towing vehicle 200.

The load levelling device 10 further includes a user operable levelling jack 110. The levelling jack 110 has an upper end 112, a body 113 and a lower end 114 and is attached at its upper end 112 through a gimballed mount to a chassis of the towed vehicle 300, and at its lower end to the trailing edge 104 of the tensioning blade 100. The levelling jack 110 has a user operable handle (not shown) and an internal screw mechanism which allows an operator to apply a large upwards force, by the winding of the handle and its internal screw mechanism, of up to 4000 Newtons to the trailing end 104 of the tensioning blade 100. This force is then transmitted as a moment or torque to the clutch housing 80 as described above, and thus transmitted to the towing vehicle 200 to adjust the vehicle axle loadings and thus in turn the pitch of the towing vehicle 200 with respect to the horizontal ground surface.

In use, the trailing end 104 of the tensioning blade 100 is connected to the unpowered or towed vehicle 300 in such a manner that the trailing end 104 of the tensioning blade 100 can be raised further than its natural position, by the action of the levelling jack 110. The levelling jack 110 is engaged by means of its cylindrical body 113 to a mounting system attached to the towed vehicle 300. The levelling jack 110, as it is progressively shortened by the rotation of the handle, imparts an increasing torque in the vertical plane onto the clutch housing 80 via the lifting of the trailing end 104 of the tensioning blade 100. In use, the levelling jack 110 can be used to adjust the rear ride height of the towing vehicle 200 until it is repositioned to within, for example, about 30% of the downwards deflection caused by the tow ball load of the towed vehicle 300 from the original unloaded ride height.

At the same time, should the towed vehicle 300 have a tendency to rotate in the horizontal plane (yaw), it will be forced to rotate the tensioning blade 100 in the same plane about the vertical axis X-X formed by the longitudinal centreline of the towing pillar 30.

Should the coupling plate 50 be engaged with the towing tongue 20 as a result of user rotation of the cam lever 96, this relative yawing rotation of towed vehicle 300 to towing vehicle 200 can only occur where the towed vehicle 300 exerts a torque about the towing pillar 30, via the tensioning blade 100, that is greater than the clutch breakaway torque, regardless of the direction of rotation or angular velocity.

The mount system that retains the levelling jack 110 to the chassis of the towed vehicle 300 is shown in FIG. 5 and FIG. 6. The mount system is a trunnion mount system or fixture as will be known in the art and includes a generally U-shaped trunnion bracket 120 that is attached directly by bolting or welding to the chassis of the towed vehicle 300, on its centreline and immediately above the trailing end 104 of the tensioning blade 100.

Figure 7:
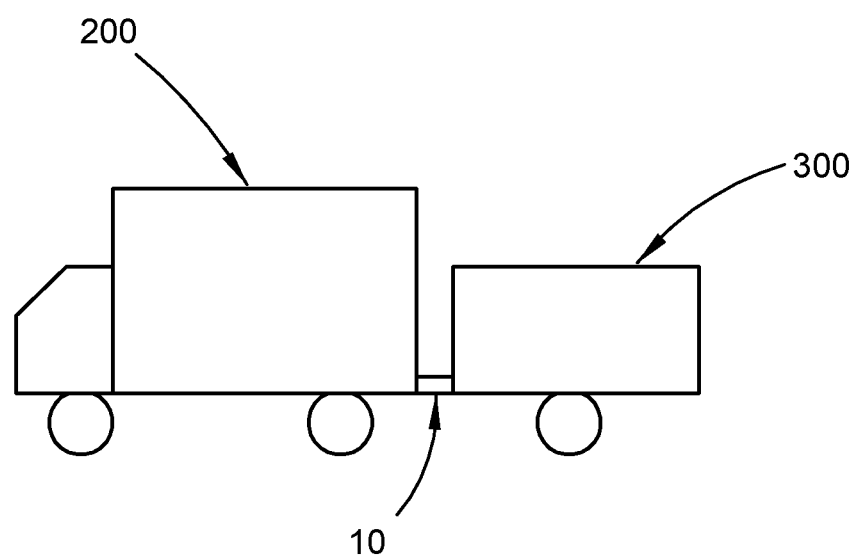
FIG. 7 is a schematic representation of the load levelling device attached to a first towing vehicle and a second towed vehicle.

Two trunnion halves 122, 124 each comprise of a semi-circular bracket that is sized to fit closely around the cylindrical body 113 of the levelling jack 110. The two halves are fitted around the levelling jack 110 body 113 and are bolted together using trunnion bolts 126 around the body 113 of the levelling jack 110, such that they trap the levelling jack 110 rigidly between them. Male grooves/ribs in the trunnion halves 122, 124 engage in correspondingly shaped female grooves 116 in the body 113 of the levelling jack 110. In the embodiment shown in FIG. 6, the grooves 116 are laterally oriented across the body of the levelling jack 110. This engagement of the male ribs and female grooves prevents vertical slippage of the levelling jack in the trunnion halves 122, 124 regardless of axial load applied by the levelling jack 110. The trunnion halves 122, 124 are then pivotably held within the trunnion bracket 120 by washers 127 and fastening bolts 128. The load levelling device 10 is then attached to the towing vehicle 200 and the towed vehicle 300 as shown schematically in FIG. 7.

It will be appreciated by the skilled person that the locations of the recesses 27 and the lugs 52 may be swapped such that the recesses are located in the coupling plate and the lugs on the towing tongue.

When the load levelling device is not in use, the user may unlock the lugs 52 from the recesses 27 by rotating the cam lever 96 to close the rotary cam 90 mechanism. The coupling plate 50, clutch housing 80 and the components it houses are then free to rotate on the shaft 32 and can be rotated for stowage underneath the towing vehicle 200.

The components of the load levelling device are made of alloy, carbon-chrome spring and stainless steels. The components of the load levelling device are machined and can be pre-assembled such that the device components other than the tensioning blade 100, the levelling jack and its trunnion mount components 120-128 are pre-assembled onto the towing tongue 20 as a single unit. The load levelling device is then fitted to the towing vehicle 200 via fastening bolts through the apertures 24 in the vehicle attachment portion 21 of the towing tongue 20.

The levelling jack 110 and its associated trunnion mount system 120-128 must be installed by welding or bolting to the trailer or towed vehicle 300.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A load levelling device for adjusting the pitch of a first towing vehicle relative to a ground surface when the first towed vehicle is coupled to a second towed vehicle, the load levelling device comprising:
    a towing pillar having a longitudinal axis;
    a towing tongue adapted for attachment to the first towing vehicle and mounted on the towing pillar for sliding engagement therewith;
    a clutch housing radially supported on the towing pillar beneath the towing tongue for sliding engagement with the towing pillar, the clutch housing including a blade recess in a lateral portion thereof, the blade recess extending orthogonally to the longitudinal axis of the towing pillar;
    a tensioning blade having a leading end and a trailing end, the leading end adapted for being removably securable in the blade recess of the clutch housing and the trailing end being adapted for attachment to the second towed vehicle;
    and a user operational force application device for selectively applying a vertical force to the trailing end of the tensioning blade, whereby an upwardly applied force on the trailing end of the tensioning blade imparts a counter-clockwise moment to the tensioning blade, which counter-clockwise moment is transmitted through the clutch housing, the towing pillar and the towing tongue, so as to level the pitch of a first towing vehicle to which the load levelling device is attached, relative to the ground surface.

2. A load levelling device as claimed in claim 1, further comprising:
    a friction clutch arranged on the towing pillar beneath the towing tongue and adapted for selective locking engagement with the towing tongue to prevent relative rotation between the towing tongue and the friction clutch.

3. A load levelling device as claimed in claim 2, further including a user operable locking device for selectively locking the friction clutch to the towing tongue.

4. A load levelling device as claimed in claim 2, wherein the friction clutch includes:
    a coupling plate mounted on the towing pillar beneath the towing tongue and adapted for selective locking engagement with the towing tongue to prevent relative rotation therebetween;
    at least one coupling plate biasing member adapted for biasing the coupling plate away from the towing tongue;
    a friction plate arranged within the clutch housing beneath the coupling plate and in direct contact with the coupling plate;
    a pressure plate arranged within the clutch housing beneath the friction plate, and at least one friction clutch biasing member adapted for biasing the pressure plate and friction plate against the coupling plate;
    wherein the user operable locking device is adapted for selectively locking the coupling plate to the towing tongue.

5. A load levelling device as claimed in claim 4, wherein the coupling plate includes one of lugs and corresponding recesses in an upper surface thereof and the towing tongue includes the other of the lugs and corresponding recesses in a lower surface thereof, and wherein the user operable locking device includes a rotary cam that is user rotatable to cause the coupling plate to lift against the towing tongue to engage the lugs into the corresponding recesses.

6. A load levelling device as claimed in claim 5, including a handle adapted for user rotation of the rotary cam in a plane orthogonal to the longitudinal axis to selectively engage or disengage the lugs into or from the corresponding recesses.

7. A load levelling device as claimed in claim 5, wherein the rotary cam includes at least one ramp projection adapted for engaging a lower surface of the coupling plate to lift the coupling plate against the towing tongue to engage the lugs into the corresponding recesses.

8. A load levelling device as claimed in claim 7, wherein the lower surface of the coupling plate further includes at least one ramp projection corresponding to the rotary cam ramp projection to assist the lifting of the coupling plate against the towing tongue.

9. A load levelling device as claimed in claim 1, further comprising a user operable levelling jack connected to the trailing end of the tensioning blade for application of the upward force to the trailing end of the tensioning blade.

10. A load levelling device as claimed in claim 9, wherein the levelling jack is connected to the tensioning blade via a trunnion mount system.

* * * * *